(12) United States Patent
Chamberlin, III

(10) Patent No.: US 6,242,394 B1
(45) Date of Patent: *Jun. 5, 2001

(54) TWO-STROKE CYCLE LUBRICANT AND METHOD OF USING SAME

(75) Inventor: William B. Chamberlin, III, Kirltand, OH (US)

(73) Assignee: The Lubrizol Corporation, Wickliffe, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/344,043

(22) Filed: Nov. 23, 1994

Related U.S. Application Data

(63) Continuation-in-part of application No. 08/067,780, filed on May 26, 1993, now abandoned, which is a continuation-in-part of application No. 07/707,724, filed on May 30, 1991, now abandoned.

(51) Int. Cl.$^7$ ................... C10M 133/00; C10M 133/14
(52) U.S. Cl. ................... 508/549; 508/542; 508/557; 508/561
(58) Field of Search ................... 252/51.5 R; 508/549, 508/542, 557, 561

(56) References Cited

U.S. PATENT DOCUMENTS

| | | |
|---|---|---|
| 2,896,593 | 7/1959 | Riemenschneider ............ 123/1 |
| 3,251,853 | 5/1966 | Hoke ............ 260/309.6 |
| 3,326,801 | 6/1967 | Schlobohm et al. ............ 252/51.5 |
| 3,337,459 | 8/1967 | Ford ............ 252/51.5 |
| 3,405,064 | 10/1968 | Miller ............ 252/51.5 |
| 3,429,674 | 2/1969 | Hoke ............ 44/58 |
| 3,753,905 | 8/1973 | Souillard et al. ............ 252/33.4 |
| 3,838,049 | 9/1974 | Souillard et al. ............ 252/32.7 |
| 3,857,791 | 12/1974 | Ellis et al. ............ 252/51.5 A |
| 4,100,082 | 7/1978 | Clason et al. ............ 252/33.4 |
| 4,200,545 | 4/1980 | Clason et al. ............ 252/33.4 |
| 4,231,757 | 11/1980 | Davis ............ 44/63 |
| 4,250,045 | 2/1981 | Coupland et al. ............ 252/32.7 |
| 4,320,020 | 3/1982 | Lange ............ 252/51.5 |
| 4,320,021 | 3/1982 | Lange ............ 252/51.5 |
| 4,347,148 | 8/1982 | Davis ............ 252/51.5 |
| 4,379,065 | 4/1983 | Lange ............ 252/51.5 |
| 4,394,135 | 7/1983 | Andress ............ 44/71 |
| 4,425,138 | 1/1984 | Davis ............ 44/58 |
| 4,663,063 | 5/1987 | Davis ............ 252/51.5 |
| 4,705,643 | 11/1987 | Nemo ............ 252/51.5 |
| 4,708,809 | 11/1987 | Davis ............ 252/33.4 |
| 4,724,091 | 2/1988 | Davis ............ 252/33.4 |

OTHER PUBLICATIONS

"The Coming of Passenger Car Two–Stroke Engines: Assessing the Lubricant Challenges Ahead," W.B. Chamberlin, paper FL–91–116 presented at the National Fuels and Lubricants Meeting of the National Petroleum Refiners Assn. Nov. 7–8, 1991.

Smalheer et al., "Lubricant Additives", Section I, p 1–11, 1967.*

* cited by examiner

*Primary Examiner*—Ellen M. McAvoy
(74) *Attorney, Agent, or Firm*—David M. Shold; Michael F. Esposito

(57) ABSTRACT

A lubricant composition suitable for fuel injected two-stroke cycle engines includes an oil of lubricating viscosity, an amount, sufficient to reduce or prevent piston scuffing, of a mixture of (A) at least one phenol selected from (A-1) an aminophenol and (A-2) a reaction product of a nitrophenol and an amino compound, and (B) at least one Mannich dispersant, amine dispersant, nitrogen-containing carboxylic dispersant, or ester dispersant. The composition further includes an amount, sufficient to reduce degradation of the lubricant composition upon exposure to oxygen or oxides of nitrogen, of a nitrogen-containing inhibitor, a hindered phenol inhibitor, or a sulfur-containing organic inhibitor.

41 Claims, No Drawings

TWO-STROKE CYCLE LUBRICANT AND METHOD OF USING SAME

CROSS-REFERENCE TO RELATED APPLICATIONS

This is a continuation-in-part of U.S. Application Ser. No. 08/067,780, filed May 26, 1993, now abandoned, which in turn is a continuation-in-part of U.S. application Ser. No. 07/707,724, filed May 30, 1991, now abandoned.

SUMMARY OF THE INVENTION

This invention relates to lubricant compositions, and fuel-lubricant mixtures useful in two-stroke cycle engines. The invention also includes a method of controlling piston scuffing.

INTRODUCTION TO THE INVENTION

Over the past several decades the use of sparkignited two-cycle (two-stroke) internal combustion engines has steadily increased. They are presently found in power lawn mowers and other power-operated garden equipment, power chain saws, pumps, electrical generators, marine outboard engines, snowmobiles, motorcycles and the like.

The increasing use of two-stroke cycle engines coupled with increasing severity of the conditions in which they have operated has led to an increased demand for oils to adequately lubricate such engines. Among the problems associated with two-stroke cycle engines is piston lubricity, scuffing or scoring. This condition is generally controlled by adding relatively high viscosity oils (greater than or equal to 100 centistokes (cSt) at 40° C.) or bright stock. The higher viscosity oils and bright stock act to increase viscosity and prevent piston seizure. A problem associated with the use of these materials is deposit or varnish formation in the combustion chamber which may lead to preignition. High molecular weight polymers may be used to replace some or all of bright stock in two-stroke cycle engines. The polymer acts to increase viscosity and prevent piston seizure. The problem associated with the use of bright stock or high viscosity oils or high molecular weight polymers is that the products tend to cause fouling of the spark plug in a two-stroke cycle engine.

Aminophenols are useful in two-stroke cycle engines. U.S. Pat. Nos. 4,320,020 and 4,320,021 issued to Lange, relate to aminophenols and their use in lubricants. Aminophenols have been used in combination with dispersants and detergents. U.S. Pat. Nos. 4,100,082 and 4,200,545 relate to aminophenols used in combination with neutral or basic metal salts and amine dispersants in two-stroke cycle lubricants. U.S. Pat. No. 4,379,065 issued to Lange relates to aminophenols used in combination with ashless ester dispersants. U.S. Pat. No. 4,425,138 relates to aminophenols used in lubricant-fuel mixtures for two-stroke cycle engines.

U.S. Pat. Nos. 4,663,063 and 4,724,091 issued to Davis relate to a combination of an alkyl phenol and an amino compound in two-stroke cycle engines. The former relates to an alkyl phenol together with an amino compound other than an aminophenol. The latter relates to an alkyl phenol together with an aminophenol.

The unique problems and techniques associated with the lubrication of two-cycle engines has led to the recognition by those skilled in the art of two-cycle engine lubricants as a distinct lubricant type. See, for example, U.S. Pat. Nos. 3,085,975; 3,004,837; and 3,753,905.

The compositions of the present invention are effective in controlling piston scuffing. These benefits are obtained without requiring the use need of high molecular weight polymers, bright stock or high viscosity oils.

SUMMARY OF THE INVENTION

This invention relates to a lubricant composition for two-stroke cycle engines comprising:

a major amount of at least one oil of lubricating viscosity which is free of oils having a viscosity greater than or equal to 100 cSt at 40° C., an amount sufficient to reduce or prevent piston scuffing of a mixture of (A) at least one phenol selected from (A-1) an aminophenol and (A-2) a reaction product of a nitrophenol and an amino compound, and (B) at least one ashless dispersant. The compositions may also include up to about 10% by weight of (C) at least one polyalkene having a number average molecular weight from about 400 to about 2500.

Since lubricant compositions for two-stroke cycle engines are often mixed with fuels before or during combustion, Applicants' invention also includes fuel-lubricant mixtures. Applicants have discovered that the above compositons of the present invention act to control piston scuffing while also contributing to piston lubrication, deposit control, ring stick protection, reduced exhaust port blockage and reduced visible smoke emission. These lubricant compositions use oils which have a substantially lower viscosity than traditionally used oils. In another embodiment of the invention, the lubricant compositions are free of isostearic acid, or derivatives thereof.

The present invention further provides a lubricant composition suitable for fuel injected two-stroke cycle engines, comprising at least one oil of lubricating viscosity; an amount, sufficient to reduce or prevent piston scuffing, of a mixture of (A) at least one phenol selected from (A-1) an aminophenol and (A-2) a reaction product of a nitrophenol and an amino compound; and (B) at least one Mannich dispersant, amine dispersant, nitrogen-containing carboxylic dispersant, or ester dispersant; the composition further comprises (C') an amount, sufficient to reduce degradation of the lubricant composition upon exposure to oxygen or to oxides of nitrogen, of a nitrogen-containing inhibitor, a hindered phenol inhibitor, or a sulfur-containing organic inhibitor.

DETAILED DESCRIPTION OF THE INVENTION

The term "hydrocarbyl" includes hydrocarbon, as well as substantially hydrocarbon groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

When a substituent is defined as having an average number of carbon atoms, that average number of carbon atoms is based on number average molecular weight. However, the substituent does not have to have an average number of carbon atoms. The substituent may have a specific single number of carbon atoms, e.g., 18 carbon atoms.

(A) Phenols

The compositions of the present invention include an aminophenol or reaction product of a nitrophenol and an amino compound. The term "phenol" is used in this specification in its art-accepted generic sense to refer to hydroxyaromatic compounds having at least one hydroxyl group bonded directly to a carbon of an aromatic ring. The aminophenols used in this invention contain at least one of each of the following substituents: a hydroxyl group and an R group as defined herein. Each of the foregoing groups must be attached to a carbon atom which is a part of an aromatic nucleus in the Ar moiety. They need not, however, each be attached to the same aromatic ring if more than one aromatic nucleus is present in the Ar moiety.

The aromatic moiety, Ar, of the aminophenols and nitrophenols can be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein at least two aromatic nuclei are fused at two points to another nucleus such as found in naphthalene, anthracene, the azanaphthalenes, etc. Such polynuclear aromatic moieties also can be of the linked type wherein at least two nuclei (either mono or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 sulfur atoms, amino linkages, polyamino linkages and mixtures of such divalent bridging linkages. In certain instances, more than one bridging linkage can be present in Ar between aromatic nuclei. For example, a fluorene nucleus has two benzene nuclei linked by both a methylene linkage and a covalent bond. Such a nucleus may be considered to have 3 nuclei but only two of them are aromatic. Normally, Ar will contain only carbon atoms in the aromatic nuclei per se.

The single ring aromatic nucleus which can be the Ar moiety can be represented by the general formula: $ar(Q)_m$ wherein ar represents a single ring aromatic nucleus (e.g., benzene) of 4 to 10 carbon atoms, each Q independently represents a lower alkyl group, lower alkoxyl group, methylol or lower hydrocarbon-based substituted methylol, or halogen atom, and m is 0 to 3, preferably 2. As used in this specification and appended claims, "lower" refers to groups having 7 or less, preferably 1 to about 3 carbon atoms such as lower alkyl and lower alkoxyl groups. Halogen atoms include fluorine, chlorine, bromine and iodine atoms; usually, the halogen atoms are fluorine and chlorine atoms.

Examples of single ring Ar moiety include benzene moieties, such as 1,2,4-benzenetriyl; 1,2,3-benezenetriyl; 3-methyl-1,2,4-benzenetriyl; 2-methyl-5-ethyl-1,3,4-benzenetriyl; 3-propoxy-1,2,4,5-benzenetetrayl; 3-chloro-1, 2,4-benzenetriyl; 1,2,3,5-benzenetetrayl; 3-cyclohexyl-1,2, 4-benzenetriyl; and 3-azocyclopentyl-1,2,5-benzenetriyl, and pyridine moieties, such as 3,4,5-azabenzene; and 6-methyl-3,4,5-azabenzene.

When Ar is a polynuclear fused-ring aromatic moiety, it can be represented by the general formula:

ar

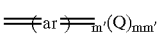

wherein ar, Q and m are as defined hereinabove, m' is 1 to 4 and each

represents a pair of fusing bonds fusing two rings to make two carbon atoms part of the rings of each of two adjacent rings and mm' is the sum of m and m'. Specific examples of fused ring aromatic moieties Ar include: 1,4,8-naphthylene; 1,5,8-naphthylene; 3,6-dimethyl-4,5,8(1-azonaphthalene); 7-methyl-9-methoxy- 1,2,5,9-anthracenetetrayl; 3,10-phenathrylene; and 9-methoxy-benz(a)phenanthrene-5,6,8,1 2-yl.

When the aromatic moiety Ar is a linked polynuclear aromatic moiety it can be represented by the general formula: $ar(\ Lng\text{-}ar\ )_w(Q)m_w$ wherein w is an integer of 1 to about 20, ar is as described above with the proviso that there are at least 3 unsatisfied (i.e., free) valences in the total of ar groups, Q and m are as defined hereinbefore, mw is the sum of m and w, and each Lng is one or more of the above linkages.

Specific examples of Ar when it is linked polynuclear aromatic moiety include: 3,3',4,4',5-bibenzenetetrayl; di(3, 4-phenylene)ether; 2,3-phenylene-2,6-naphthylenemethane; and 3-methyl,9H-fluorene-1,2,4,5,8-yl; 2,2-di(3,4-phenylene)propane; sulfur-coupled 3-methyl-1,2,4-benzatriyl (having 1 to about 10 thiomethylphenylene groups); and amino-coupled 3-methyl-1,2,4-benzatriyl (having 1 to about 10 aminomethylphenylene groups).

Usually all these Ar moieties are unsubstituted except for the R and —OH groups (and any bridging groups).

For such reasons as cost, availability, performance, etc., the Ar moiety is normally a benzene nucleus, lower alkylene bridge benzene nucleus, or a naphthalene nucleus. Thus, a typical Ar moiety is a benzene or naphthalene nucleus having 3 to 5 unsatisfied valences, so that one or two of said valences may be satisfied by a hydroxyl group with the remaining unsatisfied valences being, insofar as possible, either ortho or para to a hydroxyl group. Preferably, Ar is a benzene nucleus having 3 to 4 unsatisfied valences so that one can be satisfied by a hydroxyl group with the remaining 2 or 3 being either ortho or para to the hydroxyl group.

(A-1) Aminophenol

As mentioned above, the invention of the present invention includes an aminophenol. Preferably, the aminophenol is represented by the formula

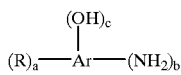

wherein R is a hydrocarbyl substituent having an average of about 10 up to about 400 carbon atoms; (a), (b) and (c) are each independently an integer from 1 up to 3 times the number of aromatic nuclei present in Ar with the proviso that the sum of (a) plus (b) plus (c) does not exceed the unsatisfied valencies of Ar; and Ar is an aromatic moiety which is substituted by from 0 to 3 substituents selected from the group consisting of lower alkyl, alkoxyl, nitro, halo or combinations of two or more thereof. The number of aromatic nuclei, fused, linked or both, in the above-described Ar can play a role in determining the integer values of a, b and c. For example, when Ar contains a single aromatic nucleus, a, b and c are each independently 1 to 4. When Ar contains two aromatic nuclei, a, b and c can each be an integer from 1 to 8, that is, up to three times the number of aromatic nuclei present (in naphthalene, 2). With a tri-nuclear aromatic moiety (Ar), a, b and c can each be an integer of 1 to 12. For instance, when Ar is a biphenyl or a naphthyl moiety, a, b and c can each independently be an integer of 1 to 8. The values of a, b and c are limited by the fact that their sum cannot exceed the total unsatisfied valences of Ar.

The phenolic compounds used in the present invention contain, directly bonded to the aromatic moiety Ar, a hydrocarbyl group (R) of at least about 10 aliphatic carbon atoms. Usually, the hydrocarbyl group has at least about 30, more typically, at least about 50 aliphatic carbon atoms and up to about 400, more typically, up to about 300 carbon atoms. In one embodiment, the hydrocarbyl group has a number average molecular weight from about 400 to about 3000, preferably about 500 to about 2500, more preferably about 700 to about 1500.

Illustrative hydrocarbyl groups containing at least ten carbon atoms are n-decyl, n-dodecyl, tetrapropenyl, n-octadecyl, oleyl, chlorooctadecyl, triicontanyl, etc. Generally, the hydrocarbyl groups R are derived from poly-alkenes. The polyalkenes are homo- or interpolymers (e.g., copolymers, terpolymers) of mono- and di-olefins having 2 to 10 carbon atoms, such as ethylene, propylene, butene-1, isobutene, butadiene, isoprene, 1-hexene, 1-octene, etc. Typically, these olefins are 1-monoolefins. The R groups can also be derived from the halogenated (e.g., chlorinated or brominated) analogs of such polyalkenes. The R groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the R groups may be reduced or eliminated by hydrogenation according to procedures known in the art.

Specific examples of the hydrocarbyl (R) groups containing an average of more than about 30 carbon atoms are the following: a mixture of poly(ethylene/propylene) groups of about 35 to about 70 carbon atoms; a mixture of the oxidatively or mechanically degraded poly(ethylene/propylene) groups of about 35 to about 70 carbon atoms; a mixture of poly(propylene/1-hexene) groups of about 80 to about 150 carbon atoms; and a mixture of polybutene groups having an average of 50 to 75 carbon atoms. A preferred source of the group R are polybutenes obtained by polymerization of a $C_4$ refinery stream having a butene content of 35 to 75 weight percent and isobutene content of 30 to 60 weight percent in the presence of a Lewis acid catalyst such as aluminum trichloride or boron trifluoride.

The attachment of the hydrocarbyl group R to the aromatic moiety Ar of the aminophenols used in this invention can be accomplished by a number of techniques well known to those skilled in the art. One particularly suitable technique is the Friedel-crafts reaction, wherein an olefin (e.g., a polymer containing an olefinic bond, or halogenated or hydrohalogenated analog thereof, is reacted with a phenol. The reaction occurs in the presence of a Lewis acid catalyst (e.g., boron trifluoride and its complexes with ethers, phenols, hydrogen fluoride, etc., aluminum chloride, aluminum bromide, zinc dichloride, etc.). Methods and conditions for carrying out such reactions are well known to those skilled in the art. See, for example, the discussion in the article entitled, "Alkylation of Phenols" in Kirk-Othmer "Encyclopedia of Chemical Technology", Second Edition, Vol. 1, pages 894–895, Interscience Publishers, a division of John Wiley and Company, N.Y., 1963. Other equally well known appropriate and convenient techniques for attaching the hydrocarbon-based group R to the aromatic moiety Ar will occur readily to those skilled in the art.

As mentioned, the aromatic moiety (Ar) may contain up to 3 optional substituents which are lower alkyl, lower alkoxyl, carboalkoxy methylol or lower hydrocarbon-based substituted methylol, nitro, nitroso, halo, amino, or combinations of two or more of these optional substituents. These substituents may be attached to a carbon atom which is part of the aromatic nucleus in Ar. They need not, however, be attached to the same aromatic ring if more than one ring is present in Ar.

In the preferred embodiment, the aminophenols used in this invention contain one each of the foregoing substituents (i.e., a, b and c are each one) and Ar is a single aromatic ring, preferably benzene. This preferred class of aminophenols can be represented by the formula

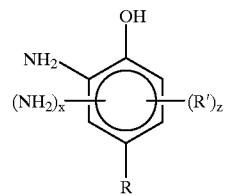

wherein R is defined above; R' is a member selected from the group consisting of lower alkyl, lower alkoxyl, carboalkoxy nitro, nitroso and halo; x is 0 or 1;

and z is 0 or 1. Generally, the R group is located ortho or para to the hydroxyl group, and z is usually 0. Most often, there is only one amino group in the aminophenol used in the invention, i.e., x equals 0.

The aminophenols of the present invention can be prepared by a number of synthetic routes. For example, an aromatic hydrocarbon or a phenol may be alkylated and then nitrated to form an intermediate. The intermediate may be reduced by any means known to those in the art. The alkylated aromatic hydrocarbon nitro intermediate may be reacted with water to form hydroxylnitro alkylated aromatics which may then be reduced to aminophenols as is known to those skilled in the art.

Techniques for nitrating phenols are known. See, for example, in Kirk-Othmer "Encyclopedia of Chemical Technology", Second Edition, Vol. 13, the article entitled "Nitrophenols", page 888 et seq., as well as the treatises "Aromatic Substitution; Nitration and Halogenation" by P.B.D. De La Mare and J. H. Ridd, N.Y., Academic Press, 1959; "Nitration and Aromatic Reactivity" by J. G. Hogget, London, Cambridge University Press, 1961; and "The Chemistry of the Nitro and Nitroso Groups", Henry Feuer, Editor, Interscience Publishers, N.Y., 1969.

Reduction of aromatic nitro compounds to the corresponding amines is also well known. See, for example, the article entitled "Amination by Reduction" in Kirk-Othmer "Encyclopedia of Chemical Technology", Second Edition, Vol. 2, pages 76–99. Generally, such reductions can be carried out with, for example, hydrogen, carbon monoxide or hydrazine, (or mixtures of same) in the presence of metallic catalysts such as palladium, platinum and its oxides, nickel, copper chromite, etc. Co-catalysts such as alkali or alkaline earth metal hydroxides or amires (including aminophenols) can be used in these catalyzed reductions.

Nitro groups can also be reduced in the Zinin reaction, which is discussed in "Organic Reactions", Vol. 20, John Wiley & Sons, N.Y., 1973, page 455 et seq. Generally, the Zinin reaction involves reduction of a nitro group with divalent negative sulfur compounds, such as alkali metal sulfides, polysulfides and hydrosulfides.

The nitro groups can be reduced by electrolytic action; see, for example, the "Amination by Reduction" article, referred to above.

Typically the aminophenols used in this invention are obtained by reduction of nitrophenols with hydrazine or hydrogen in the presence of a metallic catalyst such as discussed above. This reduction is generally carried out at temperatures of about 15°–250° C., typically, about 50°–150° C. When using hydrogen, the hydrogen pressures are about 0–2000 psig, typically, about 50–250 psig. The reaction time for reduction usually varies between about 0.5–50 hours. Substantially inert liquid diluents and solvents, such as ethanol, cyclohexane, etc., can be used to facilitate the reaction. The aminophenol product is obtained by well known techniques such as distillation, filtration, extraction, and so forth.

The reduction is carried out until at least about 50%, usually about 80%, of the nitro groups present in the nitro intermediate mixture are converted to amino groups. The typical route to the aminophenols of this invention just described can be summarized as (1) nitrating with at least one nitrating agent at least one compound of the formula: $(R)_a$—Ar—$(OH)_c$ wherein a, c, R and Ar are as defined above and Ar has 0 to 3 optional substituents (R') as defined above and (2) reducing at least about 50% of the nitro groups in said first reaction mixture to amino groups.

The following specific illustrative examples describe the preparation of the aminophenols useful in the compositions of this invention. In the following examples, as well as in the claims and specification, the parts are parts by weight, the temperature is degrees Celsius and the pressure is atmospheric, unless otherwise indicated.

EXAMPLE A-1

A mixture of 4578 parts of a polybutene-substituted phenol prepared by boron trifluoride-phenol catalyzed alkylation of phenol with a polybutene having a number average molecular weight of approximately 1000 (vapor phase osmometry), 3052 parts of 100 neutral mineral oil and 725 parts of textile spirits is heated to 60° to achieve homogenity. After cooling to 30°, 319.5 parts of 16 molar nitric acid in 600 parts of water is added to the mixture. Cooling is necessary to keep the mixture's temperature below 40°. After the reaction mixture is stirred for an additional two hours, an aliquot of 3710 parts is transferred to a second reaction vessel. This second portion is treated with an additional 127.8 parts of 16 molar nitric acid in 130 parts of water at 25°–30°. The reaction mixture is stirred for 1.5 hours and then stripped to 220°/30 torr. Filtration provides an oil solution of the desired intermediate.

A mixture of 810 parts of the oil solution of the above prepared intermediate, 405 parts of isopropyl alcohol and 405 parts of toluene is charged to an appropriately sized autoclave. Platinum oxide catalyst (0.81 part) is added and the autoclave is evacuated and purged with nitrogen four times to remove any residual air. Hydrogen is fed to the autoclave at a pressure of 29–55 psig. while the content is stirred and heated to 27°–92° for a total of 13 hours. Residual excess hydrogen is removed from the reaction mixture by evacuation and purging with nitrogen four times. The reaction mixture is then filtered through diatomaceous earth and the filtrate stripped to provide an oil solution of the desired aminophenol. This solution contains 0.58% nitrogen.

EXAMPLE A-2

To a mixture of 361.2 parts of a deca(propylene)-substituted phenol and 270.9 parts of glacial acetic acid, at 7°–17°, is added a mixture of 90.3 parts of nitric acid (70–71% $HNO_3$) and 90.3 parts of glacial acetic acid. The addition is carried out over 1.5 hours while the reaction mixture is cooled externally to keep it at 7°–17°. The cooling bath is removed and the reaction stirred for two hours at room temperature. The reaction is then stripped at 134°/35 torr and filtered to provide the desired nitrated intermediate as a filtrate having a nitrogen content of 4.65%.

A mixture of 150 parts of the above intermediate and 50 parts of ethanol is added to an autoclave. This mixture is degassed by purging with nitrogen and 0.75 part of palladium on charcoal catalyst is added. The autoclave is evacuated and pressured with nitrogen several times and then put under a hydrogen pressure of 100 psig. The reaction mixture is kept at 95 to 100° for 2.5 hours while the hydrogen pressure varies from 100 to 20 psig. As the hydrogen pressure drops below 30 psig., it is adjusted back to 100 psig. The reaction is continued for 20.5 hours at which point the autoclave is reopened and an additional 0.5 part of palladium on charcoal catalyst added. After repeated nitrogen purging (3 times) the autoclave is again pressured to 100 psig. with hydrogen and the reaction continued for an additional 16.5 hours. A total of 2.0 moles of hydrogen is fed to the autoclave. The reaction mixture is filtered and stripped to 130°/16 torr. A second filtration provides the aminophenol product as a filtrate which is predominantly a monoamine product having the amino group ortho to the hydroxyl group and the deca(propylene) substituent para to the hydroxyl group.

EXAMPLE A-3

To a mixture of 3685 parts of a polybutene- substituted phenol (wherein the polybutene substituent contains 40 to 45 carbon atoms) and 1400 parts of textile spirits is added 790 parts of nitric acid (70%). The reaction temperature is kept below 50°. After being stirred for about 0.7 hour, the reaction mixture is poured into 5000 parts of ice and stored for 16 hours. The organic layer which separates is washed twice with water and then combined with 1000 parts of benzene. This solution is stripped to 170° and the residue filtered to provide the desired intermediate as a filtrate.

A mixture of 130 parts of the above intermediate, 130 parts of ethanol, and 0.2 part of platinum oxide (86.4% PtO$_2$) is charged to a hydrogenation bomb. The bomb is purged several times with hydrogen and then charged to 54 psig. with hydrogen. The bomb is rocked for 24 hours and again charged to 70 psig. with hydrogen. Rocking is continued for an additional 98 hours. Stripping of the resulting reaction mixture to 145°/760 torr provides the desired aminophenol product as a semi-solid residue.

EXAMPLE A-4

A mixture of 105 parts of the intermediate of Example A-3, 303 parts cyclohexane and 4 parts commercial Raney nickel catalyst is charged to an appropriately sized hydrogenation bomb. The bomb is pressured to 1000 psig. with hydrogen and agitated at about 50° for 16 hours. The bomb is again pressured to 1100 psig. and agitated for another 24 hours. The bomb is then opened and the reaction mixture filtered and recharged to the bomb with a fresh portion of 4 parts of Raney nickel catalyst. The bomb is pressured to 1100 psig. and agitated for 24 hours. The resultant reaction mixture is stripped to 95°/28 torr to provide the aminophenol product as a semi-solid residue.

EXAMPLE A-5

To a mixture of 400 parts of polybutene-substituted phenol (wherein the polybutene substituent contains approximately 100 carbon atoms), 125 parts of textile spirits and 266 parts of a diluent mineral oil at 28° is slowly added 22.8 parts of nitric acid (70%) in 50 parts of water over a period of 0.33 hour. The mixture is stirred at 28°–34° for two hours and stripped to 158°/30 torr, filtration provides an oil solution (40%) of the desired nitrophenol intermediate having a nitrogen content of 0.88%.

A mixture of 93 parts of the above intermediate and 93 parts of a mixture of toluene and isopropanol (50/50 by weight) is charged to an appropriately sized hydrogenation vessel. The mixture is degassed and nitrogen purged; 0.31 part of a commercial platinum oxide catalyst (86.4% PtO$_2$) is added. The reaction vessel is pressured to 57 psig and held at 50°–60° for 21 hours. A total of 0.6 mole of hydrogen is fed to the reaction vessel. The reaction mixture is then filtered and the filtrate stripped to yield the desired aminophenol product as an oil solution containing 0.44% nitrogen.

EXAMPLE A-6

A reaction vessel is charged with 750 parts of 100 neutral diluent oil and 1000 parts of a polybutenyl-substituted phenol derived from a polybutene (number average molecular weight equals 940). The mixture is heated to 45°–65° C. and 89.5 parts of a 62% solution of nitric acid is added to the reaction mixture. The reaction temperature is maintained at 60°–65° C. for two hours. The reaction mixture is heated to 155°–165° C. under nitrogen. Hydrazine hydrate (71 parts) is added to the reaction mixture over 6.5 hours. The reaction is filtered through diatomaceous earth under nitrogen. The filtrate is the desired product and has a total base number (TBN) of 23, 0.55% nitrogen, and 40% 100 neutral-mineral oil.

(A-2) Reaction Products of a Nitrophenol and an Aminophenol Compound

In another embodiment, the compositions of the present invention include the reaction product of a nitrophenol and an amino compound. The nitrophenol may be represented by the following formula:

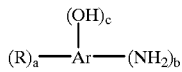

wherein a, b, c, R and Ar are as defined above. In a preferred embodiment the nitrophenols used in this invention contain a single aromatic ring, most preferably a benzene ring. This preferred class of nitrophenols can be represented by the formula:

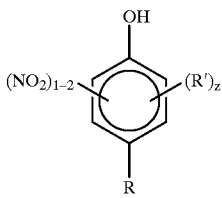

wherein R, R' and z and are as defined above.

The nitrophenols used in this invention can be prepared by a number of known synthetic routes. Various routes for preparing nitrophenols are discussed above.

The nitrophenols of the present invention are reacted with an amino compound. The amino compound may be a mono- or polyamine, including hydroxy monoamines, hydroxy polyamines, amine condensates, alkoxylated alkaline polyamines, heterocyclic polyamines, and dispersants.

The monoamines generally contain from 1 to about 24 carbon atoms, preferably 1 to about 12, and more preferably 1 to about 6. Examples of monoamines useful in the present invention include methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary amines include trimethylamine, tributylamine, methyldiethylamine, ethyldibutylamine, etc.

In another embodiment, the amino compound may be a hydroxyamine. Typically, the hydroxyamines are primary, secondary or tertiary alkanol amines or mixtures thereof. Such amines can be represented by the formulae:

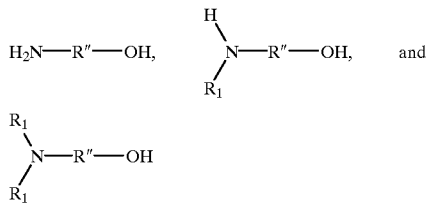

wherein each $R_1$ is independently a hydrocarbyl group of one to about eight carbon atoms or hydroxyhydrocarbyl group of two to about eight carbon atoms, preferably one to about four, and R" is a divalent hydrocarbyl group of about two to about 18 carbon atoms, preferably two to about four. The group —R"—OH in such formulae represents the hydroxyhydrocarbyl group. R" can be an acyclic, alicyclic or aromatic group. Typically, R" is an acyclic straight or branched alkylene group such as an ethylene, 1,2-propylene, 1,2-butylene, 1,2-octadecylene, etc. group. Where two $R_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R_1$ is independently a methyl, ethyl, propyl, butyl, pentyl or hexyl group. Examples of these alkanolamines include mono-, di-, and triethanol amine, diethylethanolamine, ethylethanolamine, butyldiethanolamine, etc.

The hydroxyamines can also be an ether N-(hydroxyhydrocarbyl)amine. These are hydroxypoly (hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with aforedescribed amines and can be represented by the formulae:

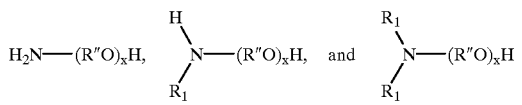

wherein x is a number from about 2 to about 15 and $R_1$ and R" are as described above. $R_1$ may also be a hydroxypoly (hydrocarbyloxy) group.

The amino compound may also be an ammonium cation derived from a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

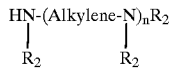

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_2$ is independently preferably hydrogen; or an aliphatic or hydroxy-substituted aliphatic group of up to about 30 carbon atoms. Preferably $R_2$ is defined the same as $R_1$.

Such alkylene polyamines include methylene polyamines, ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines are ethylene diamine, triethylene tetramine, tris-(2-aminoethyl)amine, propylene diamine, trimethylene diamine, tripropylene tetramine, tetraethylene pentamine, hexaethylene heptamine, pentaethylenehexamine, etc.

Higher homologs obtained by condensing two or more of the above-noted alkylene amines are similarly useful as are mixtures of two or more of the aforedescribed polyamines.

Ethylene polyamines, such as some of those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentaamine and 76.61% pentaethylene hexamine and higher (by weight). These alkylene polyamine bottoms include cyclic condensation products such as piperazine and higher analogs of diethylenetriamine, triethylenetetramine and the like.

These alkylene polyamine bottoms can be reacted solely with the nitrophenol or they can be used with other amines, polyamines, or mixtures thereof.

Another useful polyamine is a condensation reaction between at least one hydroxy compound with at least one polyamine reactant containing at least one primary or secondary amino group. The hydroxy compounds are preferably polyalkanolamines. The polyhydric alcohols are described below. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris (hydroxymethyl)aminomethane (THAM).

Polyamine reactants, which react with the aforementioned hydroxy compound to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 220° C. to about 250° C.) in the presence of an acid catalyst.

The amine condensates and methods of making the same are described in PCT publication WO86/05501 which is incorporated by reference for its disclosure to the condensates and methods of making the same. The preparation of such polyamine condensates may occur as follows: A 4-necked 3-liter round-bottomed flask equipped with glass stirrer, thermowell, subsurface $N_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris(hydroxymethyl)-aminomethane (THAM). This mixture is heated to 60° C. and 23 grams of 85% $H_3PO_4$ is added.

The mixture is then heated to 120° C. over 0.6 hour. With $N_2$ sweeping, the mixture is then heated to 150° C. over 1.25 hour, then to 235° C. over 1 hour more, then held at 230–235° C. for 5 hours, then heated to 240° C. over 0.75 hour, and then held at 240–245° C. for 5 hours. The product is cooled to 150° C. and filtered with a diatomaceous earth filter aid. Yield: 84% (1221 grams).

In another embodiment, the amino compounds are hydroxy-containing polyamines. Hydroxy-containing polyamine analogs of hydroxy monoamines, particularly alkoxylated alkylenepolyamines (e.g., N,N(diethanol) ethylene diamine) can also be used. Such polyamines can be made by reacting the above-described alkylene amines with one or more of the above-described alkylene oxides. Similar alkylene oxide-alkanol amine reaction products can also be used such as the products made by reacting the afore-described primary, secondary or tertiary alkanol amines with ethylene, propylene or higher epoxies in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,Nbis(2-hydroxyethyl)-ethylenediamine, 1-(2-hydroxyethyl) piperazine, mono(hydroxypropyl)-substituted tetraethylenepentamine, N-(3-hydroxybutyl)-tetramethylene diamine, etc. Higher homologs obtained by condensation of the aboveillustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the amino compound may be a cation derived from heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkylsubstituted piperidines, piperazine, aminoalkylsubstituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

In another embodiment, the amino compound may be from a dispersant. The dispersants include: nitrogen-containing carboxylic dispersants; amine dispersants; nitrogen-containing ester dispersants; Mannich dispersants; and dispersant viscosity improvers and mixtures thereof. The dispersants are discussed below.

To make the reaction product of a nitrophenol and an amino compound, at least one nitrophenol is condensed with at least one of the above-described amines. The reaction is a condensation reaction which is continued until the reaction product is substantially free of nitro groups. The reaction is generally carried out at a temperature of 25° C. up to the decomposition temperature of the reaction mixture of the individual components. Generally, this temperature is below 250° C., preferably between 50–175° C.

When the nitrophenol contains less than about 15 carbon atoms per nitro group per molecule it is desirable to conduct the initial part of the condensation at a lower temperature (e.g., 0° C. to 50° C.) and with care since violent reaction is possible. Generally, at least half of an equivalent of nitrophenol is used for each equivalent of amino compound. Usually it is not advantageous to use more than three equivalents of nitro compound per equivalent of amino compound or eight equivalents of amino compound per equivalent of nitrophenol.

In a typical embodiment, the total amounts of nitrophenol and amino compound employed in the condensation are in a ratio of about 0.5–10 equivalents of amino compound per mole of nitrophenol, preferably about 1.0–5.

The following examples relate to the reaction products of a nitrophenol with an amino compound.

EXAMPLE A-7

An alkylated phenol is prepared by reacting phenol with a polybutene having a number average molecular weight of approximately 1000 (vpo) in the presence of a boron trifluoride-phenol complex catalyst. The product formed is vacuum stripped to 230° C. and 760 tor and then 205° C./50 tor to provide a polybutene-substituted phenol.

The polybutene-substituted phenol (4578 parts), 3052 parts of a 100 neutral mineral oil and 725 parts of textile spirits is heated with agitation to 60° C. After cooling to 30° C., a mixture of 319.5 parts of a 16-molar nitric acid and 600 parts is slowly added into the mixture which is kept below 40° C. by external cooling. After stirring the mixture for an additional 2 hours, 3710 parts is transferred to a second reaction vessel. The remaining material is stripped to 150° C./43 tor, cooled to 110° C. and filtered through diatomaceous earth to provide as a filtrate the desired nitrophenol. This material has a nitrogen content of 0.53%.

The above nitrophenol (1353 parts) is added to 61.5 parts of a commercial polyethylenepolyamine mixture containing 33.5% nitrogen and substantially corresponding in empirical formula to tetraethylenepentamine. The reaction mixture is heated to 80° C. for 1.5 hours and then stored for 16 hours at 25° C. It is then heated to 130–160° C. for a total 15 hours and finally stripped to 160/30 tor. The residue is filtered through diatomaceous earth to give a product which contains 1.5% nitrogen.

EXAMPLE A-8

A mixture of 1600 parts of a polybutene-substituted phenol prepared as described in Example A from polybutene having a number average molecular weight of 1400 (gel permeation chromatography), 10 parts of aqueous hydrochloric acid and 33 parts of paraformaldehyde is heated to 90° C. under nitrogen atmosphere for 20 hours with intermittent storage at room temperature. 500 parts of textile spirits are then added, followed by 91.3 parts of concentrated nitric acid and 100 parts water. During the nitric acid addition the reaction temperature is maintained at 30–38° C. by external cooling. The reaction mixture is then stirred for two hours at room temperature and 61.5 parts of polyethylene polyamine described in Example A is added slowly. The reaction mixture is heated to 160° C. for seven hours and then stripped at 160° C. and 30 tor. The residue is filtered through diatomaceous earth to yield a product that has a nitrogen content of 0.88%.

EXAMPLE A-9

An oil solution (679 parts) of a nitropolybutene-substituted phenol made as described in Example A and comprising 60% by weight of the oil solution is added to a reaction vessel containing 134 parts of triethanolamine. The addition is accomplished over 1.5 hours. The reaction mixture is held for 12 hours at 200° C. The mixture is stripped to 200° C./20 tor and cooled to 100° C. The reaction mixture is filtered through diatomaceous earth to provide a product containing 0.97% nitrogen.

(B) Ashless Dispersants

The composition of the present invention also includes an ashless 20 dispersant. The dispersant includes nitrogen-containing carboxylic dispersants, amine dispersants, ester dispersants and Mannich dispersants. In one embodiment, the dispersants may be post-treated with such reagents as urea, thiourea, carbon disulfide, aldehydes, ketones, carboxylic acids, hydrocarbon-substituted succinic anhydrides, nitriles, epoxides, boron compounds, phosphorus compounds, etc. In another embodiment the composition is substantially free from dispersants treated with phosphorus compounds.

Nitrogen-containing Carboxylic Dispersants

The nitrogen-containing carboxylic dispersants include reaction products of hydrocarbyl-substituted carboxylic acylating agents such as substituted carboxylic acids or derivatives thereof. The amines are described above, typically the amines are polyamines, preferably the amines are ethylene amines, amine bottoms or amine condensates.

The hydrogen-substituted carboxylic acylating agent may be derived from a monocarboxylic acid or a polycarboxylic acid. Polycarboxylic acids generally are preferred. The acylating agents may be a carboxylic acid or derivatives of the carboxylic acid such as the halides, esters, anhydrides, etc., preferably acid, esters or anhydrides, more preferably anhydrides. Preferably the carboxylic acylating agent is a succinic acylating agent.

The hydrocarbyl-substituted carboxylic acylating agent includes agents which have a hydrocarbyl group derived from a polyalkene. The polyalkene is characterized as containing from at least about 8 carbon atoms, preferably at least about 30, more preferably at least about 35 up to about 300 carbon atoms, preferably 200, more preferably 100. In one embodiment, the polyalkene is characterized by an n (number average molecular weight) value of at least about 500. Generally, the polyalkene is characterized by an n value of about 500 to about 5000, preferably about 800 to about 2500. In another embodiment n varies between about 500 to about 1200 or 1300.

In another embodiment, the hydrocarbyl groups are derived from polyalkenes having an n value of at least about 1300 up to about 5000, and the w/n value is from about 1.5 to about 4, preferably from about 1.8 to about 3.6, more preferably about 2.5 to about 3.2. The preparation and use of substituted succinic acylating agents wherein the substituent is derived from such polyolefins are described in U.S. Pat. No. 4,234,435, the disclosure of which is hereby incorporated by reference.

The polyalkenes include homopolymers and interpolymers of polymerizable olefin monomers of 2 to about 16 carbon atoms; usually 2 to about 6, preferably 2 to about 4, more preferably 4. The olefins may be monoolefins such as ethylene, propylene, 1-butene, isobutene, and 1-octene; or a polyolefinic monomer, preferably diolefinic monomer, such 1,3-butadiene and isoprene. Preferably, the polymer is a homopolymer. An example of a preferred polymer is a polybutene, preferably a polybutene in which about 50% of the polymer is derived from isobutylene. The polyalkenes are prepared by conventional procedures.

The hydrocarbyl-substituted carboxylic acylating agents are prepared by a reaction of one or more polyalkenes with one or more unsaturated carboxylic reagent. The unsaturated carboxylic reagent generally contains an alpha-beta olefinic unsaturation. The carboxylic reagents may be carboxylic acids per se and functional derivatives thereof, such as anhydrides, esters, amides, imides, salts, acyl halides, and nitriles. These carboxylic acid reagents may be either monobasic or polybasic in nature. When they are polybasic they are preferably dicarboxylic acids, although tri- and tetracarboxylic acids can be used. Specific examples of useful monobasic unsaturated carboxylic acids are acrylic acid, methacrylic acid, cinnamic acid, crotonic acid, 2-phenylpropenoic acid, etc. Exemplary polybasic acids include maleic acid, fumaric acid, mesaconic acid, itaconic acid and citraconic acid. Generally, the unsaturated carboxylic acid or derivative is maleic anhydride or maleic or fumaric acid or ester, preferably, maleic acid or anhydride, more preferably maleic anhydride.

The polyalkene may be reacted with the carboxylic reagent such that there is at least one mole of reagent for each mole of polyalkene. Preferably, an excess of reagent is used. This excess is generally between about 5% to about 25%.

In another embodiment, the acylating agents are prepared by reacting the above described polyalkene with an excess of maleic anhydride to provide substituted succinic acylating agents wherein the number of succinic groups for each equivalent weight of substituent group is at least 1.3. The maximum number will not exceed 4.5. A suitable range is from about 1.4 to 3.5 and more specifically from about 1.4 to about 2.5 succinic groups per equivalent weight of substituent groups. In this embodiment, the polyalkene preferably has an n from about 1300 to about 5000 and a w/n of at least 1.5, as described above, the value of n is preferably between about 1300 and 5000. A more preferred range for n is from about 1500 to about 2800, and a most preferred range of n values is from about 1500 to about 2400.

The conditions, i.e., temperature, agitation, solvents, and the like, for reacting an acid reactant with a polyalkene, are known to those in the art. Examples of patents describing various procedures for preparing useful acylating agents include U.S. Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); and U.K. 1,440,219. The disclosures of these patents are hereby incorporated by reference.

Amine Dispersants

The dispersant may also be an amine dispersant. Amine dispersants are hydrocarbyl-substituted amines. These hydrocarbyl-substituted amines are well known to those skilled in the art. These amines are disclosed in U.S. Pat. Nos. 3,275,554; 3,438,757; 3,454,555; 3,565,804; 3,755,433; and 3,822,289. These patents are hereby incorporated by reference for their disclosure of hydrocarbyl amines and methods of making the same.

Typically, amine dispersants are prepared by reacting olefins and olefin polymers (polyalkenes) with amines (mono- or polyamines). The polyalkene may be any of the polyalkenes described above. The amines may be any of the amines described above. Examples of amine dispersants include poly(propylene)amine; N,N-dimethyl-N-poly(ethylene/propylene)amine, (50:50 mole ratio of monomers); polybutene amine; N,N-di(hydroxyethyl)-N-polybutene amine; N-(2-hydroxypropyl)-N-polybutene amine; N-polybutene-aniline; N-polybutenemorpholine; N-poly(butene)ethylenediamine; N-poly-(propylene) trimethylenediamine; N-poly(butene)diethylenetriamine; N',N'-poly-(butene)tetraethylenepentamine; N,N-dimethyl-N'-poly(propylene)-1,3-propylenediamine and the like.

Ester Dispersants

In another embodiment, the dispersant may also be an ester dispersant. The ester dispersant is prepared by reacting at least one of the above hydrocarbyl-substituted carboxylic acylating agents with at least one organic hydroxy compound and optionally an amine. In another embodiment, the ester dispersant is prepared by reacting the acylating agent with the above-described hydroxy amine.

The organic hydroxy compound includes compounds of the general formula $R^4(OH)_m$ wherein $R^4$ is a monovalent or polyvalent organic group joined to the —OH groups through a carbon bond, and m is an integer of from 1 to about 10 wherein the hydrocarbyl group contains at least about 8 aliphatic carbon atoms. The hydroxy compounds may be aliphatic compounds such as monohydric and polyhydric alcohols, or aromatic compounds such as phenols and naphthols. The aromatic hydroxy compounds from which the esters may be derived are illustrated by the following specific examples: phenol, beta-naphthol, alpha-naphthol, cresol, resorcinol, catechol, p,p'-dihydroxybiphenyl, 2-chlorophenol, 2,4-dibutylphenol, etc.

The alcohols from which the esters may be derived preferably contain up to about 40 aliphatic carbon atoms, preferably from 2 to about 30, more preferably 2 to about 10. They may be monohydric alcohols such as methanol, ethanol, isooctanol, dodecanol, cyclohexanol, etc. In one embodiment, the hydroxy compounds are polyhydric alcohols, such as alkylene polyols. Preferably, the polyhydric alcohols contain from 2 to about 40 carbon atoms, more preferably 2 to about 20; and from 2 to about 10 hydroxyl groups, more preferably 2 to about 6. Polyhydric alcohols include ethylene glycols, including di-, tri- and tetraethylene glycols; propylene glycols, including di-, tri- and tetrapropylene glycols; glycerol; butane diol; hexane diol; sorbitol; arabitol; mannitol; sucrose; fructose; glucose; cyclohexane diol; erythritol; and pentaerythritols, including di- and tripentaerythritol; preferably, diethylene glycol, triethylene glycol, glycerol, sorbitol, pentaerythritol and dipentaerythritol.

The polyhydric alcohols may be esterified with monocarboxylic acids having from 2 to about 30 carbon atoms, preferably about 8 to about 18, provided that at least one hydroxyl group remains unesterified. Examples of monocarboxylic acids include acetic, propionic, butyric and fatty carboxylic acids. The fatty monocarboxylic acids have from about 8 to about 30 carbon atoms and include octanoic, oleic, stearic, linoleic, dodecanoic and tall oil acids. Specific examples of these esterified polyhydric alcohols include sorbitol oleate, including mono- and dioleate, sorbitol stearate, including mono- and distearate, glycerol oleate, including glycerol mono-, di- and trioleate and erythritol octanoate.

The carboxylic ester dispersants may be prepared by any of several known methods. The method which is preferred because of convenience and the superior properties of the esters it produces, involves the reaction of a the carboxylic acylating agents described above with one or more alcohols or phenols in ratios of from about 0.5 equivalent to about 4 equivalents of hydroxy compound per equivalent of acylating agent. The esterification is usually carried out at a temperature above about 100° C., preferably between 150° C. and 300° C. The water formed as a by-product is removed by distillation as the esterification proceeds. The preparation of useful carboxylic ester dispersant is described in U.S. Pat. Nos. 3,522,179 and 4,234,435.

The carboxylic ester dispersants may be further reacted with at least one of the above described amines and preferably at least one of the above described polyamines. In one embodiment, the amount of amine which is reacted is an amount sufficient to neutralize any unesterified carboxylic acid groups. In one preferred embodiment, the nitrogen-containing carboxylic ester dispersants are prepared by reacting about 1.0 to 2.0 equivalents, preferably about 1.0 to 1.8 equivalents of hydroxy compounds, and up to about 0.3 equivalent, preferably about 0.02 to about 0.25 equivalent of polyamine per equivalent of acylating agent.

In another embodiment, the carboxylic acid acylating agent may be reacted simultaneously with both the alcohol and the amine. There is generally at least about 0.01 equivalent of the alcohol and at least 0.01 equivalent of the amine although the total amount of equivalents of the combination should be at least about 0.5 equivalent per equivalent of acylating agent. These nitrogen-containing carboxylic ester dispersant compositions are known in the art, and the preparation of a number of these derivatives is described in, for example, U.S. Pat. Nos. 3,957,854 and 4,234,435 which have been incorporated by reference previously.

The carboxylic ester dispersants and methods of making the same are known in the art and are disclosed in U.S. Pat. Nos. 3,219,666, 3,381,022, 3,522,179 and 4,234,435 which are hereby incorporated by reference for their disclosures of the preparation of carboxylic ester dispersants.

Mannuch Dispersants

The dispersant may also be a Mannich dispersant. Mannich dispersants are formed by the reaction of at least one aldehyde, at least one of the above described amine and at least one hydroxyaromatic compound. The reaction may occur from room temperature to 225° C., usually from 50° to about 200° C. (75° C.–125° C. most preferred), with the amounts of the reagents being such that the molar ratio of hydroxyaromatic compound to formaldehyde to amine is in the range from about (1:1:1) to about (1:3:3).

The first reagent is a hydroxyaromatic compound which is described above. This term includes phenols (which are preferred), carbon-, oxygen-, sulfur- and nitrogen-bridged phenols and the like as well as phenols directly linked through covalent bonds (e.g. 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds can be used as the first reagent.

The hydroxyaromatic compounds are those substituted with at least one, and preferably not more than two, aliphatic or alicyclic groups having at least about 6 (usually at least about 30, more preferably at least 50) carbon atoms and up to about 400 carbon atoms, preferably 300, more preferably 200. These groups may be derived from the above described polyalkenes. In one embodiment, the hydroxyaromatic compound is a phenol substituted with an aliphatic or alicyclic hydrocarbon-based group having an n of about 420 to about 10,000.

The second reagent is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanals, as well as aldehyde precursors which react as aldehydes under the conditions of the reaction such as paraformaldehyde, paraldehyde, formalin and methal. Formaldehyde and its precursors (e.g., paraformaldehyde, trioxane) are preferred. Mixtures of aldehydes may be used as the second reagent.

The third reagent is any amine described above. Preferably the amine is a polyamine as described above.

Mannnich dispersants are described in the following patents: U.S. Pat. No. 3,980,569; U.S. Pat. No. 3,877,899; and U.S. Pat. No. 4,454,059 (herein incorporated by reference for their disclosure to Mannich dispersants).

The following specific illustrative examples describe the preparation of exemplary dispersants (B) useful in the compositions of this invention.

EXAMPLE B-1

A mixture of 1500 parts of chlorinated poly(isobutene) (of molecular weight of about 950 and having a chlorine content of 5.6%), 285 parts of an alkylene polyamine having an average composition corresponding stoichiometrically to tetraethylene pentamine and 1200 parts of benzene is heated to reflux. The mixture's temperature is then slowly increased over a 4-hour period to 170° C. while benzene is removed. The cooled mixture is diluted with an equal volume of mixed hexanes and absolute ethanol (1:1). This mixture is heated to reflux and a ⅓ volume of 10% aqueous sodium carbonate is added to it. After stirring, the mixture is allowed to cool and the phases separate. The organic phase is washed with water and stripped to provide the desired polyisobutenyl polyamine having a nitrogen content of 4.5%.

EXAMPLE B-2

A mixture of 140 parts of toluene and 400 parts of a polyisobutenyl succinic anhydride (prepared from the poly (isobutene) having a molecular weight of about 850, vapor phase osmometry) having a saponification number 109, and 63.6 parts of an ethylene amine mixture having an average composition corresponding in stoichiometry to tetraethylene pentamine, is heated to 150° C. while the water/toluene azeotrope is removed. The reaction mixture is then heated to 150° C. under reduced pressure until toluene ceases to distill. The residual acylated polyamine has a nitrogen content of 4.7%.

EXAMPLE B-3

A reaction vessel is charged with 820 parts of 100 neutral mineral oil and 1000 parts of a polybutenyl-substituted succinic anhydride derived from a polybutene (number average molecular weight equal to 960). The mixture is heated to 110° C. whereupon 85.0 parts of an ethylene amine mixture having an average composition corresponding to the stoichiometry of tetraethylenepentamine is added to the reaction mixture. The reaction mixture is heated to 150°–160° C. and held for four hours. The reaction mixture is cooled and filtered through diatomaceous earth. The filtrate has a total base number of 35, 1.56% nitrogen and 40% 100 neutral mineral oil.

EXAMPLE B-4

A reaction vessel is charged with 400 parts of 100 neutral mineral oil and 1000 parts of the polybutenyl succinic anhydride described in Example B-3. The mixture is heated to 88° C. where 152 parts of a condensed amine (prepared by reacting HPA Taft amines available from Union Carbide with tris(hydroxymethyl)amino methane (THAM)) is added to the reaction mixture. The reaction temperature is increased to 152° C. and maintained for 5.5 hours. The reaction mixture is cooled to 145° C. and filtered through diatomaceous earth. The filtrate contains 40% 100 neutral mineral oil and 2.15% nitrogen.

EXAMPLE B-5

To a mixture of 50 parts of a polypropyl-substituted phenol (having a molecular weight of about 900, vapor phase osmometry), 500 parts of mineral oil (a solvent refined paraffinic oil having a viscosity of 100 SUS at 100° F.) and 130 parts of 9.5% aqueous dimethylamine solution (equivalent to 12 parts amine) is added drop-wise, over an hour, 22 parts of a 37% aqueous solution of formaldehyde (corresponding to 8 parts aldehyde). During the addition, the reaction temperature is slowly increased to 100° C. and held at that point for three hours while the mixture is blown with nitrogen. To the cooled reaction mixture is added 100 parts toluene and 40 parts mixed butyl alcohols. The organic phase is washed three times with water until neutral to litmus paper and the organic phase filtered and stripped to 200° C./5–10 torr. The residue is an oil solution of the final product containing 0.5% nitrogen.

EXAMPLE B-6

A substantially hydrocarbon-substituted succinic anhydride is prepared by chlorinating a polybutene having a molecular weight of 1000 to a chlorine content of 4.5% and then heating the chlorinated polybutene with 1.2 molar proportions of maleic anhydride at a temperature of 150°–220° C. The succinic anhydride thus obtained has an acid number of 130. A mixture of 874 grams (1 mole) of the succinic anhydride and 104 grams (1 mole) of neopentyl glycol is mixed at 240–250° C./30 mm. for 12 hours. The residue is a mixture of the esters resulting from the esterification of one and both hydroxy radicals of the glycol.

It has a saponification number of 101 and an alcoholic hydroxyl content of 0.2%.

EXAMPLE B-7

An ester is prepared by heating 658 parts of a carboxylic acid having an average molecular weight of 1018 (prepared by reacting chlorinated polybutene with acrylic acid) with 22 parts of pentaerythritol while maintaining a temperature of about 180–205° C. for about 18 hours during which time nitrogen is blown through the mixture. The mixture is then filtered and the filtrate is the desired ester.

(C) Polyakenes

The compositions of the present invention may optionally contain up to 10% by weight of a polyalkene having a number average molecular weight from about 400, preferably about 500, preferably about 600 up to about 2500, preferably about 1500, more preferably about 1300. This polyalkene is described above and is preferably a polybutene. The polyalkene is present in an amount up to about 10% by weight, preferably up to about 7%, more preferably about 5%, more preferably up to about 3% by weight. In one embodiment, the polyalkene (C) is present in an amount up to about 3% by weight, preferably about 0.5% to about 1.5% by weight. The polyalkene acts to improve lubricity and antiscuff activity of the lubricant.

The lubricant compositions of the present invention also may include up to about 25% by weight of at least one substantially inert, normally liquid organic diluent. The diluent generally acts to improve miscibility of the aminophenol, dispersant and optionally polyalkenes in lubricating compositions in fuels. The diluent may be the fuel itself, Stoddard solvent, kerosene, naphtha, jet fuel or the like. The organic diluent is generally present in an amount from about 5% to about 25% by weight, preferably about 10% to about 20% by weight.

As mentioned above, the present invention provides lubricants in fuel-lubricant mixtures for two-stroke cycle engines which improve the wear and scuffing protection of pistons. The lubricating compositions of the present invention may contain up to about 3% by weight bright stock or high molecular weight polymers. Preferably, the compositions contain up to about 1.5% by weight, preferably 1% by weight, more preferably up to about 0.5% by weight, of bright stock or high molecular weight polymers. In another embodiment, the lubricating compositions are optionally free of bright stocks and high molecular weight polymers which would cause fouling of exhaust ports, spark plugs and engine uncleanliness. The expression "high molecular weight," in reference to such polymers, is understood to be given its usual interpretation in the context of high molecular weight polymeric additives for two-stroke cycle lubricants, in particular, polymers, generally poly-α-olefins, of a number average molecular weight of at least about 700, and preferably not exceeding about 2000. A typical example of such a high molecular weight polymer is polyisobutylene of number average molecular weight about 1000. The term "free of", as used in the specification and claims, defines the absence of a material except for the amount which is present as impurities, e.g., a trace amount. Typically in this embodiment, the amount present will be less than about 0.1%, preferably less than about 0.01% by weight of the composition. The lubricating compositions of the present invention may also be free of isostearic acid or derivatives thereof.

The present invention relates to lubricating compositions and to lubricant-fuels for two-cycle engines. The lubricating compositions useful for two-cycle engines will comprise a major amount by weight of at least one oil of lubricating viscosity and a minor amount, of the present additives, sufficient to control piston ring sticking, reduce rust formation, and promote general engine cleanliness.

The lubricating compositions and methods of this invention employ an oil of lubricating viscosity, including natural or synthetic lubricating oils and mixtures thereof. Natural oils include animal oils, vegetable oils, mineral lubricating oils, solvent or acid treated mineral oils, and oils derived from coal or shale. Synthetic lubricating oils include hydrocarbon oils, halo-substituted hydrocarbon oils, alkylene oxide polymers, esters of dicarboxylic acids and polyols, esters of phosphorus-containing acids, polymeric tetrahydrofurans and silcon-based oils. In one embodiment the composition is substantially free from esters of phosphorus-containing acids.

Specific examples of the oils of lubricating viscosity are described in U.S. Pat. No. 4,326,972 and European Patent Publication 107,282, both herein incorporated by reference for their disclosures relating to lubricating oils. A basic, brief description of lubricant base oils appears in an article by D. V. Brock, "Lubricant Engineering", volume 43, pages 184–185, Marchv, 1987. This article is herein incorporated by reference for its disclosures relating to lubricating oils. A description of oils of lubricating viscosity occurs in U.S. Pat. No. 4,582,618 (column 2, line 37 through column 3, line 63, inclusive), herein incorporated by reference for its disclosure to oils of lubricating viscosity.

Generally the lubricants of the present invention contain an amount of the compositions of this invention sufficient to control piston ring sticking, reduce rust formation and promote general engine cleanliness. Normally the amount of the mixture of (A) a phenol and (B) an ashless dispersant employed will be about 0.1% to about 30%, preferably about 5% to about 20% of the total weight of the lubricating composition.

Generally, the phenols (A) and the dispersants (B) are each present in an amount from about 0.05%, preferably about 1%, more preferably about 2.5% up to about 30%, preferably 20%, more preferably about 15% by weight of the lubricating composition.

The invention also contemplates the use of other additives in combination with the compositions of this invention. Such additives include, for example, corrosion- and oxidation-inhibiting agents, pour point depressing agents, extreme pressure agents, antiwear agents, color stabilizers and anti-foam agents.

Auxiliary extreme pressure agents and corrosion- and oxidation-inhibiting agents which may be included in the lubricants of the invention are exemplified by chlorinated aliphatic hydrocarbons such as chlorinated wax and chlorinated aromatic compounds; organic sulfides and polysulfides; sulfurized alkylphenol; phosphosulfurized hydrocarbons; phosphorus esters; including principally dihydrocarbon and trihydrocarbon phosphites, and metal thiocarbamates. In one embodiment the composition is substantially free from such phosphorus-containing agents.

Many of the above-mentioned auxiliary extreme pressure agents and corrosion-oxidation inhibitors also serve as antiwear agents. Zinc dialkylphosphorodithioates are a well known example. In one embodiment the composition is substantially free from such zinc phosphorodithioates.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henty T. Kerner (Noyes Data Corporation, 1976), pages 125–162.

Anti-wear and lubricity improvers, particularly sulfurized sperm oil substitutes and other fatty acid and vegetable oils, such as castor oil, are used in special applications, such as racing and for very high fuel/lubricant ratios. Scavengers or combustion chamber deposit modifiers are sometimes used to promote better spark plug life and to remove carbon deposits. Halogenated compounds and/or phosphorus-containing materials may be used for this application. In one embodiment the composition is free from such phosphorus-containing materials.

The compositions of this invention can be added directly to the lubricant. Preferably, however, they are diluted with a substantially inert, normally liquid organic diluent such as mineral oil, naphtha, benzene, toluene or xylene, to form an additive concentrate. These concentrates usually contain from about 30% to about 90% by weight of the compositions of this invention and may contain, in addition, one or more other additives known in the art or described hereinabove. The remainder of the concentrate is the substantially inert normally liquid diluent.

As is well known to those skilled in the art, two-cycle engine lubricating oils are often added directly to the fuel to form a mixture of a lubricant and fuel which is then introduced into the engine cylinder. Such lubricant-fuel oil mixtures are within the scope of this invention. Such lubricant-fuel blends generally contain about 10, preferably about 15, more preferably about 20 up to about 100, more preferably up to about 50 parts of fuel per 1 part of lubricant.

The fuels used in two-cycle engines are well known to those skilled in the art and usually contain a major portion of a normally liquid fuel such as hydrocarbonaceous petroleum distillate fuel (e.g., motor gasoline as defined by ASTM Specification D-439–73). Such fuels can also contain non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Examples of such fuel mixtures are combinations of gasoline and ethanol, diesel fuel and ether, gasoline and nitromethane, etc. Particularly preferred is gasoline, that is, a mixture of hydrocarbons having an ASTM boiling point of 60° C. at the 10% distillation point to about 205° C. at the 90% distillation point.

Two-cycle fuels also contain other additives which are well known to those of skill in the art. These may include ethers, such as ethyl-t-butyl ether, methyl-t-butyl ether and the like, alcohols such as ethanol and methanol, lead scavengers such as halo-alkanes (e.g., ethylene dichloride and ethylene dibromide), dyes, cetane improvers, antioxidants such as 2,6-di-tertiary-butyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like. The invention is useful with lead-free as well as lead- containing fuels.

Concentrates containing the compositions of this invention also are within the scope of this invention. These concentrates usually comprise one or more of the hereinabove described oils and about 50% to about 90% of the compositions of the invention comprising a mixture of (A) at least one phenol, (B) an ashless dispersant and optionally (C) a polyalkene.

The following examples relate to lubricant compositions of the present invention. The quantity of components is in percent by weight. The amount of each component includes any diluent in the product.

| Product Of: | A | B | C | D | E | F | G | H | I | J |
|---|---|---|---|---|---|---|---|---|---|---|
| A-2 | | | | | 11 | | | | | |
| A-3 | | 8 | | | | | | | | |
| A-6 | 10 | | 9.5 | 9.5 | | | 9.9 | 9.9 | 9.9 | |
| A-8 | | | | | | 8 | | | | 12 |
| B-1 | | 11 | | | 12 | | | | | |
| B-3 | 10 | | | 9.5 | | | 10.2 | | 12.1 | |
| B-4 | | | 9.5 | | | | | 10.1 | | |
| B-5 | | | | | | 12 | | | | |
| B-7 | | | | | | | | | | 8 |
| Polybutene (M$_n$ = 960) | 3 | | | 3 | | 5 | 3.1 | | | 4 |
| Stoddard Solvent | | 15 | 18 | 20 | 17 | 19 | 17.8 | 16 | 17.8 | 17 |
| 350 Neutral Mineral Oil | Bal. | Bal. | Bal. | Bal. | Bal. | Bal. | Bal. | Bal. | Bal. | Bal. |

*also contains 0.2% by weight of an esterified styrene/maleic anhydride copolymer
Bal. = Balance of the composition (C') Inhibitors It has further been found that a composition of at least one oil of lubricating viscosity and a mixture of (A) at least one reaction product of a nitrophenol and an amino compound, or (preferably) an aminophenol, as described in detail above, with (B) at least one dispersant, can be further improved by adding to the composition an additional component (C'). Component (B) is selected from the group consisting of (i) Mannich dispersants, (ii) amine dispersants, (iii) nitrogen-containing carboxylic dispersants, and (iv) ester dispersants, each of which can be prepared as described in detail above. Added component (C') is a nitrogen-containing inhibitor, a hindered phenolic inhibitor, or a sulfur-containing organic inhibitor, which is present in an amount sufficient to reduce degradation of the oil upon exposure to oxygen or to oxides of nitrogen.

The above-described embodiment of the present invention is particularly useful for lubricating direct fuel-injected crankcase-scavenged two-stroke cycle engines, that is, those in which the lubricant is not pre-mixed with the fuel. In such engines at least part of the lubricant and the air are injected into the crankcase, whence they are drawn, or scavenged, and ultimately enter the combustion chamber. The fuel is separately fed directly into the combustion chamber, rather than being drawn through the crankcase. The fuel can be injected using a pneumatic fuel injector, in which a certain amount of supplemental air is mixed with the fuel before the fuel is metered into the combustion chamber, or the injection can be accomplished without any admixture of air at this stage. The supplemental air, if any, can be supplied by an external air pump or a separate valved air passage. The air supplied to the crankcase, however, is also ultimately delivered to the combustion chamber. In an ordinary two-stroke cycle engine, all of the lubricant supplied into the crankcase is normally swept into the combustion chamber along with the air and fuel and is consumed. This is ultimately the fate of the lubricant in the above-described engines as well, although a portion of the lubricant tends to be retained in the crankcase for a longer period of time. The lubricant which collects in the crankcase is normally recovered from the crankcase sump and recirculated into the crankcase as a part of the oil-air mixture. Such engines and the problems facing lubricants designed for use therein, are described in more detail in "The Coming of Passenger Car Two-Stroke Engines: Assessing the Lubricant Challenges Ahead," by W. B. Chamberlin, paper FL-91-116, presented at the National Fuels and Lubricants Meeting of the National Petroleum Refiners Association, Nov. 7–8, 1991.

Lubricants which are used in such direct injection two-stroke cycle engines thus can experience a longer exposure time in the environment of the crankcase than is normal for ordinary two-stroke cycle engines, so that they should exhibit increased stability. A lubricant suitable for use in such engines should be resistant to the oxidative and thermal degradation which would otherwise be expected to occur upon prolonged exposure to the hot environment of the crankcase, where air (oxygen) and oxides of nitrogen are also found. For this reason the presence of the nitrogen-containing, hindered phenol, or sulfur-containing organic inhibitor is particularly beneficial. Such inhibitors provide protection against oxidation (including reaction with oxygen itself as well as reaction with oxides of nitrogen) without introducing any ash-forming components. Ash-forming components are generally undesirable in a lubricant which ultimately is to undergo combustion; hence, preferred compositions of the present invention are substantially free from ash-forming compounds (as determined by ASTM procedure D-874).

Nitrogen-containing inhibitors include materials with an N-H bond, preferably amines, and most preferably aromatic amines. Such materials include octylated diphenylamine (available as Naugalube 438L™ from Uniroyal or from Ciba-Geigy as Reomet XT™), phenyl naphthyl amines such as phenyl a-naphthyl amine, phenothiazine, hydroxy alkylated phenothiazines, alkylated amino benzotriazoles, para-phenylenediamine and substituted para-phenylenediamines, di(phenyl-2-isopropyl-phenyl)amine (Naugalube 445™), alkylated phenothiazines, heterocyclic amines including

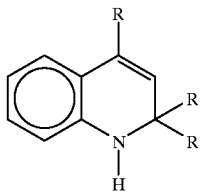

(where each R is independently a hydrocarbyl group such as methyl), dimethyl hydrazine derivatives, and hindered aniline derivatives such as those having structures

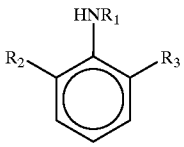

Alkyl ureas, and in particular monoalkyl ureas can also be effective in the present invention.

Particularly preferred inhibitors are those amines which are diphenyl amines, and preferably hydrocarbyl-substituted diphenyl amines. Highly preferred amines are p-nonylphenyl,phenylamine, di-p-nonylphenylamine, and a mixture of the two (which is the form in which these materials are commercially available).

Hindered phenol inhibitors include alkylphenols (particularly ortho substituted) such as di-t-butyl phenol, alkylated hydroquinones, phenols prepared by condensation of aromatic hydroxy compounds with formaldehyde and amines, and salicylic acid and derivatives thereof, particularly alkyl substituted salicylic acid and derivatives. Many phenolic inhibitors are available commercially under the trade name Irganox™.

Sulfur-containing organic inhibitors include a variety of materials such as organic sulfides, organic polysulfides, sulfurized alkylphenols, and dithiocarbamates.

Dithiocarbamates are sulfur-containing organic materials preparable by condensation of $CS_2$ with amines. The initial product is a dithiocarbamic acid:

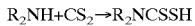

$R_2NH+CS_2 \rightarrow R_2NCSSH$ which can be reacted with an activated olefin to provide dithiocarbamate compound:

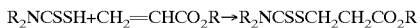

$R_2NCSSH+CH_2=CHCO_2R \rightarrow R_2NCSSCH_2CH_2CO_2R$

The dithiocarbamates are reacted with the unsaturated compounds at a temperature of about 25° C. to about 125° C., preferably about 50° C. to about 100° C., more preferably 70° C. to about 90° C. The reaction may be carrier out in the presence or absence of a solvent.

Although listed here among the sulfur-containing organic inhibitors, dithiocarbamates, by virtue of their N group, could also be considered a species of nitrogen-containing inhibitor. The dithiocarbamate-containing compounds may be dithiocarbamate esters (as illustrated above), dithiocarbamate amides, dithiocarbamic ethers, or alkylene-coupled dithiocarbamates. Generally, the dithiocarbamic acid is reacted with an unsaturated amide, ether, or ester to form the dithiocarbamate-containing compounds.

The amines employed in the initial reaction with the $CS_2$ are preferably secondary amines. Specific amines include dimethyl amine, diethyl amine, dipropyl amine, dibutyl amine, diamyl amine, dihexyl amine and diheptyl amine. Nonsymmetrical amines may also be used, including methylethyl amine, ethylbutyl amine, ethylamyl amine and the like. The unsaturated amide, ether, or esters are preferably alpha, beta unsaturated compounds, including methylacrylate, ethylacrylate, 2-ethylhexylacrylate, 2-hydroxyethylacrylate, ethylmethacrylate, 2-hydroxyethylmethacrylate, 2-hydroxypropylmethacrylate, 2-hydroxypropylacrylate, an acrylamide, and acrylonitrile, preferably acrylamides. Acrylamides include acrylamide, methacrylamide, bisacrylamide, bismethacrylamide, bismethyleneacrylamide, N-hydroxymethylacrylamide, N-mercaptomethylacrylamide, and N-(methyl, ethyl ether) acrylamide. The amines can also be polyamines, such as polyamines reacted with alkyl acylating agents (e.g. alkyl-substituted succinic anhydrides) to form succinimide dispersants.

Closely related to the dithiocarbamates are dimercaptothiadiazoles, another species of sulfur (and nitrogen) containing inhibitor. These materials are prepared by reaction of $CS_2$ with hydrazine. Dimercaptothiadiazoles consist of a five-membered ring having the structure

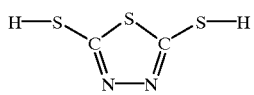

The carbon atoms are substituted by sulfur-containing groups, in particular —S—H (as shown), —S—R, or —S—S—R groups, where R is hydrocarbyl group. Substitution by —S—R groups can be obtained by addition of above material to an activated olefin such as an alkyl acrylate; substitution by —S—S—R can be obtained by reaction with an alkyl mercaptan.

Many of the above and other dithiocarbamates are described in greater detail in PCT publication WO92/19703.

The nitrogen-containing, phenol, or sulfur-containing organic inhibitors of the present invention are well known to those skilled in the art. Many of these materials are commercially available. In the present invention a single inhibitor can be used or combinations of two or more inhibitors of the same or different types can be used. The nitrogen-containing or hindered phenol inhibitors are preferred, in part because they do not introduce sulfur into the combustion chamber and thus do not contribute to formation of sulfur oxides. The nitrogen-containing, and especially the aromatic amine inhibitors are particularly preferred.

In this embodiment it is preferred that the amount of the aminophenol or reaction product of a nitrophenol and an amino compound of (A) and the amount of the dispersant (B) are each as has been indicated above, i.e., 0.05–30, preferably 1–20 and more preferably 2.5–15 weight percent. The amount of the inhibitor (C') is preferably 0.01 to 10% by weight of the composition, more preferably 0.05 to 5% by weight, and most preferably 0.2 to 2% by weight. The oil of lubricating viscosity preferably is present in a major amount, i.e., at least about 50% by weight, although lower amounts could be suitable if an engine is designed, for example, to inject a concentrate into the crankcase.

For the present embodiment of lubricant, designed for use in crankcase-scavenged fuel-injected two-stroke cycle engines, it is not known to be essential that the base lubricating oil be free from oils having a high viscosity, but such oils are considered to be preferred for the reasons set forth above. Specifically, the lubricant is preferably substantially free from oils having a viscosity greater than or equal to 200 cSt, or even 100 cSt, at 40° C.

EXAMPLES

Example K

A composition is prepared by preparing a concentrate by blending 9.9 parts by weight polyisobutyl-o-aminophenol (where the polyisobutyl group has a number average molecular weight of about 1000 and the commercial material is about 60% active ingredient and about 40% diluent oil); 10.1 parts by weight of the reaction product of polyisobutylsuccinic anhydride with polyethyleneamine (where the isobutyl group has a number average molecular weight of about 1000, the material contains about 1.5% nitrogen, and the commercial material is about 57% active ingredient and about 43% diluent oil); 0.50 parts by weight of a commercial mixture of p-nonylphenyl,phenylamine and di-p-nonylphenylamine; 0.008 parts by weight of a polymethylsiloxane foam inhibitor; and 0.25 parts by weight of diluent oil.

The concentrate prepared according this example, 20.75 parts by weight, is combined with 0.25 parts by weight of a customary pour point depressant and 79 parts by weight of a mixture of oil comprising Chevron™ RLOP base oils, 60 volume % 240 Neutral (viscosity 6.7 cSt at 40° C.) and 40 volume % 500 Neutral (viscosity 11.0 cSt at 40° C.) to provide a lubricant suitable for use in a crankcase-scavenged fuel injected two-stroke cycle engine.

Examples L–T

Example K is repeated, to provide lubricants having the compositions described in the following Table. In each case, the components are reported on an active ingredient (diluent oil free) basis, and each example contains 0.50 percent by weight of a commercial mixture of p-nonylphenyl, phenylamine and di-p-nonylphenylamine.

| Ex. | Oil Viscosity | polyisobutyl-o-aminophenol % | polyisobutylsuccinic anhydride/polyethyleneamine product, % |
|---|---|---|---|
| L | 60% 240 Neutral + 40% 500 N. | 3.0 | 2.9 |
| M | same | 9.0 | 2.9 |
| N | same | 3.0 | 8.7 |
| O | same | 9.0 | 8.7 |
| P | 100 Neutral[a] | 3.0 | 2.9 |
| Q | " | 9.0 | 2.9 |
| R | " | 5.9 | 5:8 |
| S | " | 3.0 | 8.7 |
| T | " | 9.0 | 8.7 |

[a]The 100 N oil contains 5% polyisobutylene thickener.

Example U

Example K is repeated except that the polyisobutylsuccinic anhydride/polyethyleneamine product is replaced by 10.1 parts by weight of a reaction product of polyisobutylsuccinic anhydride with polyethyleneamine similar to that in Example K, except that the material contains about 2.15% nitrogen by analysis and 40% diluent oil.

Example V

Example K is repeated except that the polyisobutyl-o-aminophenol is replaced by the aminophenol of Example A-2, above.

Example W

Example K is repeated except that the polyisobutyl-o-aminophenol is replaced by the reaction product of Example A-7.

Example X

Example K is repeated except that the hindered amine antioxidant is replaced by di-t-butylphenol.

Example Y

Example K is repeated except that the hindered amine antioxidant is replaced by phenyl a-naphthyl amine.

Example Z

Example K is repeated except that the amount of the hindered amine antioxidant is 0.05 parts by weight.

Example AA

Example K is repeated except that the amount of the hindered amine antioxidant is 5 parts by weight.

Example BB

Example K is repeated except that the hindered amine antioxidant is replaced by a comparable amount of methylene-bis-di-n-butyldithiocarbamate.

Example CC

Example K is repeated except that the polyisobutylsuccinic anhydride/polyethyleneamine product is replaced by an equal amount of the product of Example B-5.

Example DD

Example K is repeated except that the polyisobutylsuccinic anhydride/polyethyleneamine product is replaced by an equal amount of the product of Example B-7.

Example EE

Example K is repeated except that the polyisobutylsuccinic anhydride/polyethyleneamine product is replaced by an equal amount of the product of Example B-1.

Example FF

A composition is prepared by preparing a concentrate by blending 13.7 parts by weight polyisobutyl-o-aminophenol (where the polyisobutyl group has a number average molecular weight of about 1000 and the commercial material is about 60% active ingredient and about 40% diluent oil); 14.1 parts by weight of the reaction product of polyisobutylsuccinic anhydride with polyethyleneamine (where the isobutyl group has a number average molecular weight of about 1000, the material contains about 1.5% nitrogen, and the commercial material is about 57% active ingredient and about 43% diluent oil); 0.70 parts by weight of a commercial mixture of p-nonylphenyl,phenylamine and di-p-nonylphenylamine; 0.008 parts by weight of a polymethylsiloxane foam inhibitor; 0.03 parts of a polyalkylene glycol-based demulsifier; and 0.25 parts by weight of diluent oil.

The concentrate prepared according this example, 28.79 parts by weight, is combined with 0.25 parts by weight of a customary pour point depressant and 71 parts by weight of a mixture of oil comprising Esso Europe™ base oils, 50 volume % 150 Neutral and 50 volume % 600 Neutral to provide a lubricant suitable for use in a crankcase-scavenged fuel injected two-stroke cycle engine.

Example GG

A composition is prepared by preparing a concentrate by blending 14.8 parts by weight polyisobutyl-o-aminophenol (where the polyisobutyl group has a number average molecular weight of about 1000 and the commercial material is about 60% active ingredient and about 40% diluent oil); 10.1 parts by weight of the reaction product of polyisobutylsuccinic anhydride with polyethyleneamine (where the isobutyl group has a number average molecular weight of about 1000, the material contains about 1.5% nitrogen, and the commercial material is about 57% active ingredient and about 43% diluent oil); 0.50 parts by weight of a commercial mixture of p-nonylphenyl,phenylamine and di-p-nonylphenylamine; 0.02 parts of a polyalkylene glycol-based demulsifier; 11.5 parts polyisobutylene, 1000 molecular weight, from Amoco; 16 parts Stoddard solvent, and 0.25 parts by weight of diluent oil.

The concentrate prepared according this example, 53.2 parts by weight, is combined with 0.25 parts by weight of a customary pour point depressant and 46.6 parts by weight of a 325–350 Neutral oil to provide a lubricant suitable for use in a crankcase-scavenged fuel injected two-stroke cycle engine.

Each of the documents referred to above is incorporated herein by reference. Except in the Examples, or where otherwise explicitly indicated, all numerical quantities in this description specifying amounts of materials or reaction conditions are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A lubricant composition suitable for fuel injected two-stroke cycle engines, comprising:
   at least one oil of lubricating viscosity;
   an amount, sufficient to reduce or prevent piston scuffing, of a mixture of
   (A) at least one phenol selected from
      (A-1) an aminophenol and
      (A-2) a reaction product of a nitrophenol and an amino compound; and
   (B) at least one Mannich dispersant, amine dispersant, nitrogen-containing carboxylic dispersant, or ester dispersant;
   said composition further comprising:
   (C) an amount, sufficient to reduce degradation of the lubricant composition upon exposure to oxygen or to oxides of nitrogen, of a nitrogen-containing inhibitor, a hindered phenol inhibitor, or a sulfur-containing organic inhibitor;
   said composition containing 0 to about 3 percent by weight bright stock and 0 to about 3 percent by weight of polymer of a number average molecular weight at least 2500;
   provided said composition is substantially free from ash-forming components and from added phosphorus-containing components.

2. The composition of claim 1, wherein the phenol (A) is an aminophenol (A-1).

3. The composition of claim 2 wherein the aminophenol (A-1) is represented by the formula

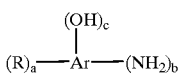

wherein each R is independently a hydrocarbyl group of about 10 to about 400 carbon atoms; a, b, and c are each independently integers from 1 up to 3 times the number of aromatic nuclei present in Ar, with the proviso that the sum of a, b, and c does not exceed the unsatisfied valences of Ar; and each Ar is independently an aromatic moiety which is substituted by from 0 to 3 substituents selected from the group consisting of lower alkyl, alkoxyl, nitro, halo, or combinations of two or more thereof.

4. The composition of claim 3, wherein R is derived from at least one polyalkene having a molecular weight from about 500 to about 2500.

5. The composition of claim 3, wherein Ar is a naphthalene nucleus, benzene nucleus, or mixtures thereof.

6. The composition of claim 3 wherein Ar comprises a plurality of aromatic nuclei linked through at least one bridging linkage.

7. The composition of claim 3, wherein a, b, and c are each 1.

8. The composition of claim 1 wherein the dispersant of (B) is a nitrogen-containing carboxylic dispersant.

9. The composition of claim 8 wherein the dispersant is the reaction product of a polyamine and a succinic acylating agent.

10. The composition of claim 1 wherein the inhibitor of (C) is a nitrogen-containing inhibitor or a hindered phenolic inhibitor.

11. The composition of claim 1 wherein the inhibitor of (C) is an aromatic amine inhibitor.

12. The composition of claim 11 wherein the aromatic amine inhibitor is a hydrocarbyl-substituted diphenylamine.

13. The composition of claim 12 wherein the aromatic amine inhibitor is a mixture of mono- and di-para-nonyldiphenylamine.

14. The composition of claim 1 wherein the oil of lubricating viscosity is free of oils having a viscosity greater than or equal to 200 cSt at 40° C.

15. The composition of claim 1 wherein the composition is free of bright stock.

16. The composition of claim 1 wherein the composition is free of high molecular weight polymer.

17. The composition of claim 1 wherein the amount of the phenol (A) is about 0.05 to about 30 percent by weight of the composition, the amount of the dispersant (B) is about 0.05 to about 30 percent by weight of the composition, and the amount of the inhibitor (C) is about 0.01 to about 10 percent by weight of the composition.

18. The composition of claim 17 wherein the amount of the phenol (A) is about 1 to about 20 percent by weight of the composition, the amount of the dispersant (B) is about 1 to about 19 weight percent of the composition, and the amount of the inhibitor (C) is about 0.05 to about 5 percent by weight of the composition.

19. The composition of claim 18 wherein the amount of the phenol (A) is about 2.5 to about 15 percent by weight of the composition, the amount of the dispersant (B) is about 2.5 to about 15 percent by weight of the composition, and the amount of the inhibitor (C) is about 0.2 to about 2 percent by weight of the composition.

20. A method of lubricating a direct fuel injected, crankcase-scavenged two-stroke cycle engine, comprising
(a) supplying to the crankcase of said engine a composition of at least one oil of lubricating viscosity;
an amount, sufficient to reduce or prevent piston scuffing, of a mixture of
(A) at least one phenol selected from
(A-1) an aminophenol and
(A-2) a reaction product of a nitrophenol and an amino compound; and
(B) at least one Mannich dispersant, amine dispersant, nitrogen-containing carboxylic dispersant, or ester dispersant;
said composition further comprising:
(C) an amount, sufficient to reduce degradation of the lubricant composition upon exposure to oxygen or to oxides of nitrogen, of a nitrogen-containing inhibitor, a hindered phenol inhibitor, or a sulfur-containing organic inhibitor;
said composition containing 0 to about 3 percent by weight bright stock and 0 to about 3 percent by weight of polymer of a number average molecular weight at least 2500; and
(b) operating the engine.

21. The method of claim 20, wherein the phenol (A) is an aminophenol (A-1).

22. The method of claim 21 wherein the aminophenol (A-1) is represented by the formula

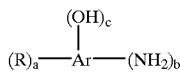

wherein each R is independently a hydrocarbyl group of about 10 to about 400 carbon atoms; a, b, and c are each independently integers from 1 up to 3 times the number of aromatic nuclei present in Ar, with the proviso that the sum of a, b, and c does not exceed the unsatisfied valences of Ar; and each Ar is independently an aromatic moiety which is substituted by from 0 to 3 substituents selected from the group consisting of lower alkyl, alkoxyl, nitro, halo, or combinations of two or more thereof.

23. The method of claim 22, wherein R is derived from at least one polyalkene having a molecular weight from about 500 to about 2500.

24. The method of claim 22, wherein Ar is a naphthalene nucleus, benzene nucleus, or mixtures thereof.

25. The method of claim 22 wherein Ar comprises a plurality of aromatic nuclei linked through at least one bridging linkage.

26. The method of claim 22, wherein a, b, and c are each 1.

27. The method of claim 20 wherein the dispersant of (B) is a nitrogen-containing carboxylic dispersant.

28. The method of claim 27 wherein the dispersant is the reaction product of a polyamine and a succinic acylating agent.

29. The method of claim 20 wherein the inhibitor of (C) is a nitrogen-containing inhibitor or a hindered phenolic inhibitor.

30. The method of claim 20 wherein the inhibitor of (C) is an aromatic amine inhibitor.

31. The method of claim 30 wherein the aromatic amine inhibitor is a hydrocarbyl-substituted diphenylamine.

32. The method of claim 31 wherein the aromatic amine inhibitor is a mixture of mono- and di-para-nonyldiphenylamine.

33. The method of claim 20 wherein the oil of lubricating viscosity is free of oils having a viscosity greater than or equal to 200 cSt at 40° C.

34. The method of claim 20 wherein the lubricating composition contains 0 to about 3 percent by weight bright stock.

35. The method of claim 20 wherein the composition is free of bright stock.

36. The method of claim 20 wherein the amount of the phenol (A) is about 0.05 to about 30 percent by weight of the composition, the amount of the dispersant (B) is about 0.05 to about 30 percent by weight of the composition, and the amount of the inhibitor (C) is about 0.01 to about 10 percent by weight of the composition.

37. The method of claim 36 wherein the amount of the phenol (A) is about 1 to about 20 percent by weight of the composition, the amount of the dispersant (B) is about 1 to about 20 weight percent of the composition, and the amount of the inhibitor (C) is about 0.05 to about 5 percent by weight of the composition.

38. The method of claim 37 wherein the amount of the phenol (A) is about 2.5 to about 15 percent by weight of the composition, the amount of the dispersant (B) is about 2.5 to about 15 percent by weight of the composition, and the amount of the inhibitor (C) is about 0.2 to about 2 percent by weight of the composition.

39. The method of claim 34 wherein the composition is substantially free from ash-forming components and from added phosphorus-containing components.

40. A lubricant composition suitable for fuel injected two-stroke cycle engines, comprising:

at least one oil of lubricating viscosity;

an amount, sufficient to reduce or prevent piston scuffing, of a mixture of (A) at least one aminophenol and (B) at least one Mannich dispersant, amine dispersant, nitrogen-containing carboxylic dispersant, or ester dispersant; said composition further comprising (C) an amount, sufficient to reduce degradation of the lubricant composition upon exposure to oxygen or to oxides of nitrogen, of an aromatic amine inhibitor;

said composition containing 0 to about 3 percent by weight bright stock and 0 to about 3 percent by weight of polymer of a number average molecular weight at least 2500;

provided said composition is substantially free from ash-forming components and from added phosphorus-containing components.

41. The lubricant composition of claim 40 wherein:

(A) is an polyisobutylaminophenol, said polyisobutyl group having a number average molecular weight of about 1000;

(B) is the reaction product of polyisobutyl succinic anhydride with polyethyleneamine said plyisobutyl group having a number average molecular weight of about 1000, and said reaction product containing about 1.5% by weight nitrogen atoms;

(C) is a mixture of p-nonylphenyl,phenylamine and di-p-nonylphenylamine; and (D) a foam inhibitor.

\* \* \* \* \*